United States Patent [19]

Shuert

[11] Patent Number: 5,143,778
[45] Date of Patent: Sep. 1, 1992

[54] LAMINATE STRUCTURAL PLASTIC MATERIAL

[76] Inventor: Lyle H. Shuert, 1034 Stratford Pl., Bloomfield Hills, Mich. 48013

[21] Appl. No.: 606,171

[22] Filed: Oct. 31, 1990

[51] Int. Cl.$^5$ ............................................. B32B 7/02
[52] U.S. Cl. ................... 428/213; 428/323; 428/324; 428/480; 428/516
[58] Field of Search ................ 428/323, 324, 480, 516

[56] References Cited

U.S. PATENT DOCUMENTS

| | | | |
|---|---|---|---|
| 4,229,504 | 10/1980 | Brachman | 428/461 |
| 4,291,084 | 9/1981 | Segal | 428/212 |
| 4,501,843 | 2/1985 | Needham | 524/445 |
| 4,526,823 | 7/1985 | Farrell et al. | 428/329 |
| 4,526,823 | 7/1985 | Farrell | 428/35 |
| 4,528,235 | 7/1985 | Sacks et al. | 428/331 |
| 4,578,296 | 3/1986 | Miyazaki et al. | 428/35 |
| 4,618,528 | 10/1986 | Sacks et al. | 428/331 |
| 4,626,456 | 12/1986 | Farrell et al. | 428/323 |
| 4,728,478 | 3/1988 | Sacks et al. | 264/288.8 |
| 4,842,951 | 6/1989 | Yamada et al. | 428/516 |
| 4,911,985 | 3/1990 | Jenkins et al. | 428/446 |

Primary Examiner—Patrick J. Ryan
Assistant Examiner—Elizabeth Evans
Attorney, Agent, or Firm—Krass & Young

[57] ABSTRACT

An improved laminated structural material; an improved method of forming a relatively rigid structural article such as a pallet; and an improved structural article using the invention laminated structural material. The invention article is formed by separately extruding relatively thin outer skin layers of a 25% talc filled polyethylene material and a relatively thick central core layer of an essentially virgin polyethylene material; bonding the layers together to form a composite laminate strip including the relatively thin talc filled outer skins and the thick central core layer of virgin polyethylene; severing the strip to form upper and lower sheets; heating the upper and lower sheets in an oven to place them in a flowable condition; delivering the upper and lower sheets respectively to upper and lower molds carried by upper and lower platens of a press; vacuum forming the upper and lower sheets respectively to the upper and lower molds; and thereafter bringing the platens of the press together to selectively knit or fuse the upper and lower sheets together to form the article. The article produced by the invention methodology costs only slightly more than an article formed of virgin polyethylene material and yet has vastly superior stiffness characteristics as compared to the virgin polyethylene article while retaining substantially all of the superior impact characteristics of the virgin polyethylene article.

51 Claims, 3 Drawing Sheets

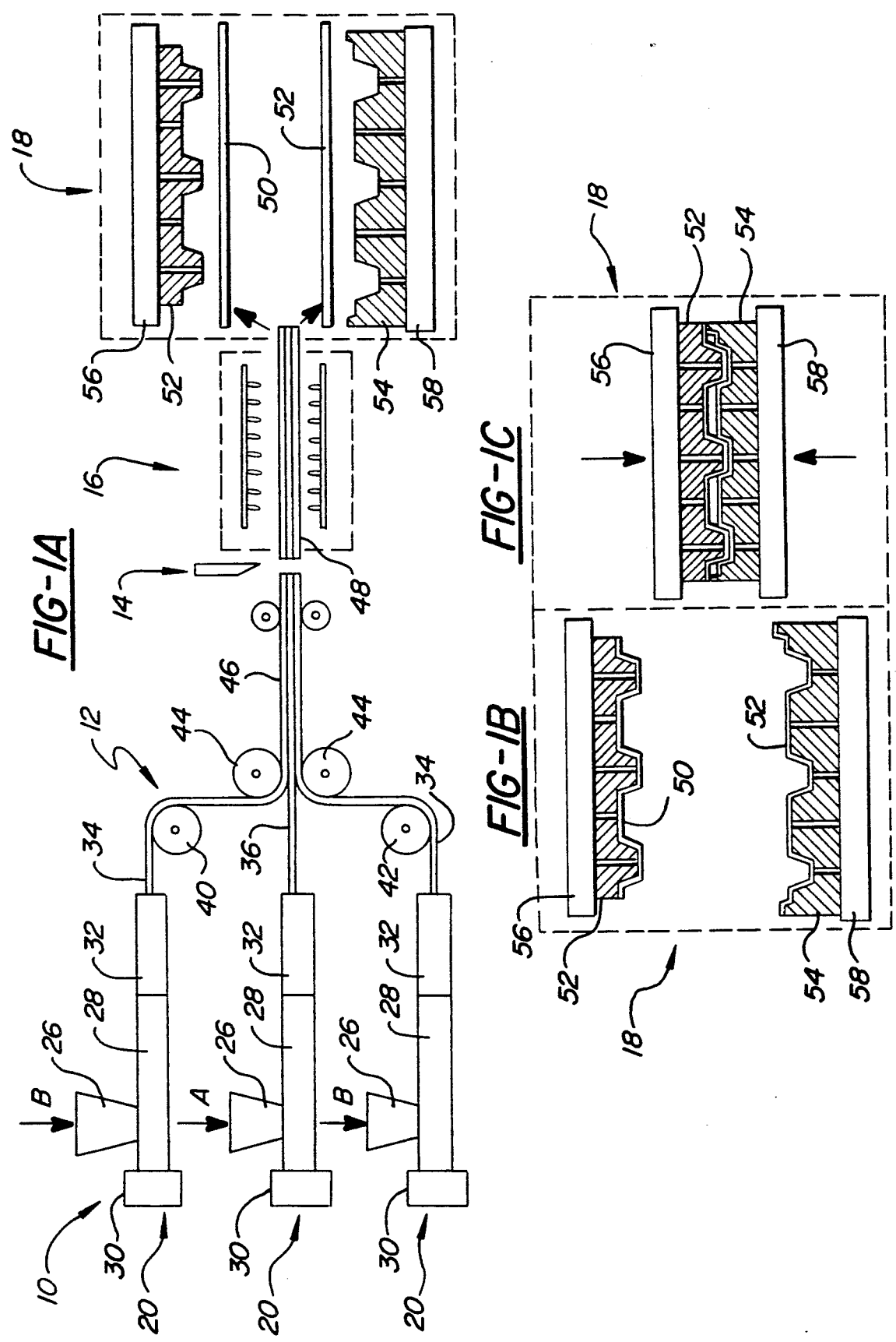

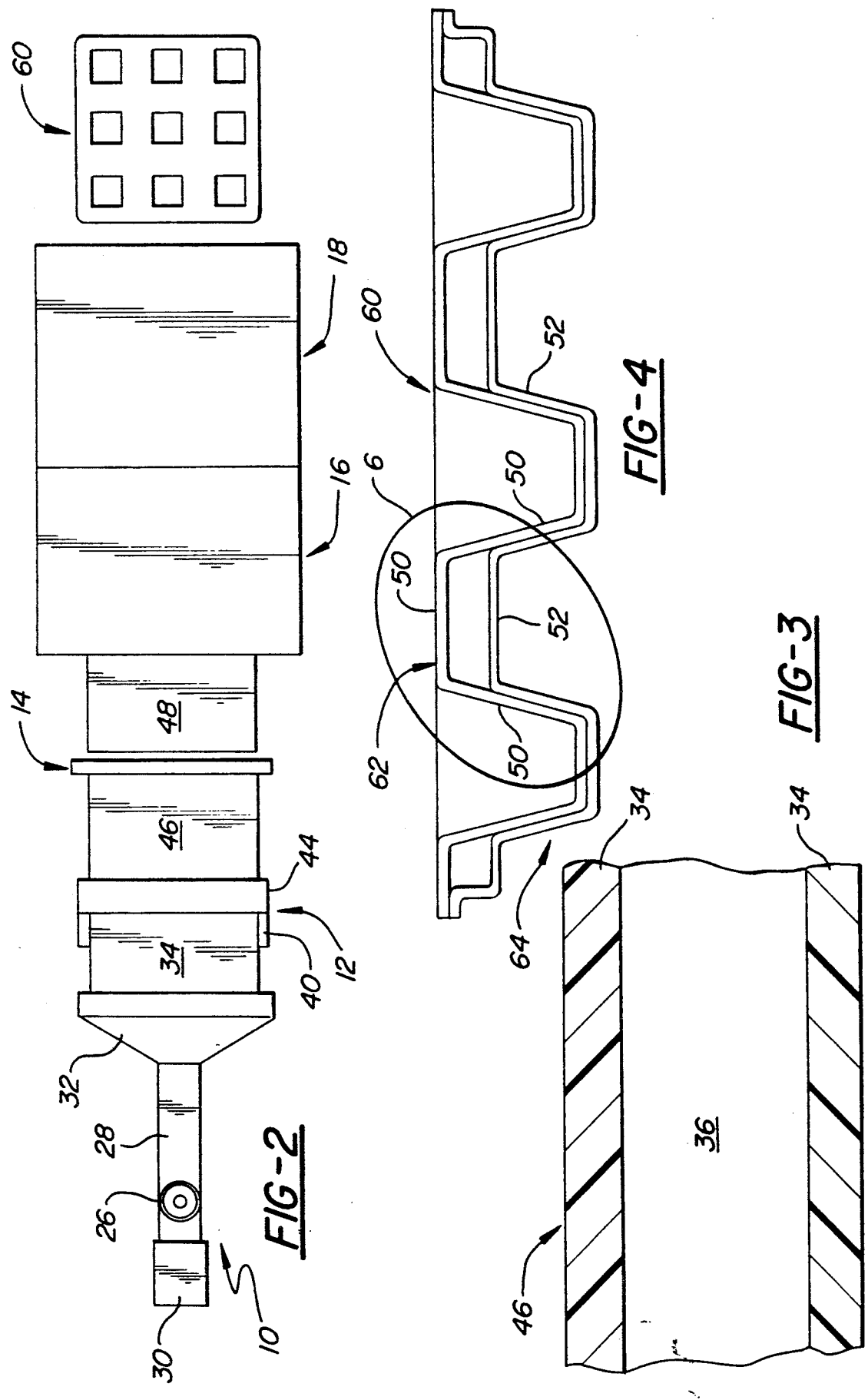

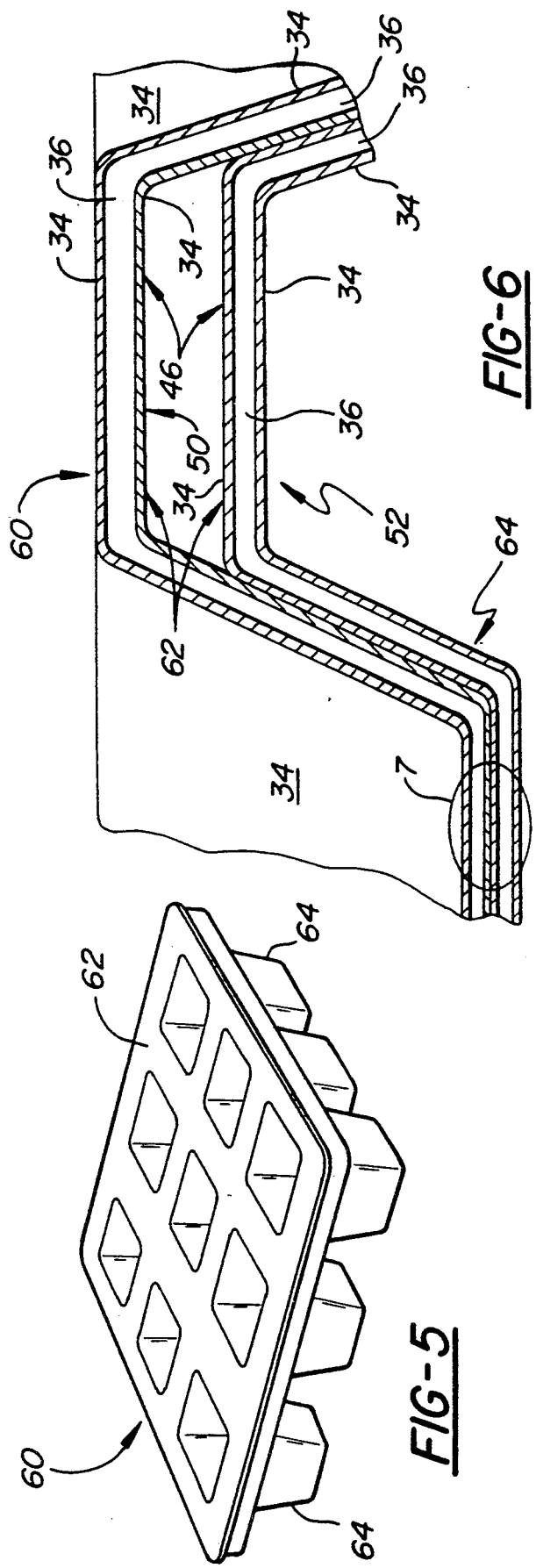

500,143,778

LAMINATE STRUCTURAL PLASTIC MATERIAL

BACKGROUND OF THE INVENTION

This invention relates to a laminate structural plastic material and to structural plastic articles formed utilizing the laminate structural material.

Plastic is finding ever increasing use in fabricating structural articles. Specifically, many structural plastic articles have been formed from a polyolefin plastic material and especially from a polyethylene plastic material. Whereas these polyolefin plastic articles have very good impact loading characteristics and therefore stand up well under the abuses encountered in the handling of the articles, their stiffness or rigidity is often marginal with the result that the articles formed from polyethylene are unsuitable for applications requiring high stiffness or rigidity.

SUMMARY OF THE INVENTION

This invention relates to an improved laminate structural plastic material and to an article formed using the laminate structural material and, more particularly, relates to a laminate structural plastic material which is especially suitable for use in forming relatively rigid plastic structural articles and which imparts both high impact and high stiffness characteristics to the structural article formed therewith.

The laminate structural material according to the invention comprises a relatively thick central inner core layer formed of a polyolefin material essentially devoid of reinforcing filler materials and a pair of relatively thin outer skin layers sandwiching the core layer therebetween and each formed of a polyolefin material having a significant percentage of a reinforcing filler material. This structure has an overall cost that is commercially competitive and provides excellent impact and stiffness characteristics.

According to a further feature of the invention, the layers are formed of polyethylene. With this arrangement, the unfilled polyethylene material comprising the central core layer provides high impact strength for the material and the filled polyethylene layers comprising the outer skin layers provide high stiffness for the material.

According to a further feature of the invention, the reinforcing filler material in the skin layers comprises an inorganic filler material such for example as a siliceous filler material selected from the group consisting of talc, mica or quartz. In the preferred embodiment of the invention, the filler material comprises talc in an amount of approximately 15-50% by weight of the skin layers. The talc filled outer skin layers provide excellent stiffness or rigidity characteristics for the material and the relatively thick, unfilled polyethylene central core layer essentially preserves the high impact characteristic of the laminate material. The core layer has a thickness at least twice as great as the thickness of each of the skin layers and preferably has a thickness at least trice as great as the thickness of each of the skin layers. The thin, talc filled outer skin layers thus comprise only a minor percentage of the total volume of material utilized in the laminate structure so that the higher cost of the talc filled polyethylene in the outer skin layers does not significantly increase the overall cost of the laminate structure and yet provides greatly improved stiffness as compared to a single layer or sheet of unfilled polyethylene.

The invention also provides a method of forming a laminate structural plastic material. The invention method comprises the steps of forming a relatively thick central inner core layer formed of a polyolefin material essentially devoid of reinforcing filler materials and a pair of relatively thin outer skin layers each formed of a polyolefin material having a significant percentage of a reinforcing filler material and bonding the layers together with the core layer sandwiched between the outer skin layers to form the laminate structured material. In the preferred embodiment, the layers are formed in a coextrusion process wherein the layers are separately extruded and then brought together while still in a heated state so as to fuse or knit the layers together to form the laminate structure.

The invention also provides a method of forming a relatively rigid structural plastic article comprising the steps of forming a central core layer of a first high impact plastic material; forming a pair of outer layers of a second high stiffness plastic material; bonding the layers together with the core layer sandwiched between the outer layers to form a laminate structural material; and thermoforming the laminate structural material to form the rigid structural article. This method provides an effective and inexpensive means of forming a rigid structural article having both high impact and high stiffness characteristics.

According to a further feature of the invention, the forming steps comprise heat extruding steps and the bonding step comprises bringing the extruded layers together while still in a heated state to form a continuous laminate strip. This methodology allows the invention laminate structural material to be formed in an efficient and cost effective manner.

According to a further feature of the invention methodology, wherein the structural article is a twin sheet article, the method includes the further step of severing the strip to form at least two individual sheets and the thermoforming step comprises individually thermoforming the sheets and thereafter selectively fusing the sheets together to form the rigid structural article. This methodology allows the invention methodology to be employed in the formation of twin sheet articles.

The invention further provides an improved structural plastic article. The improved plastic article of the invention is characterized in that the article is formed of a laminate structural material including a central core layer of a first high impact plastic material and a pair of outer layers of a second high stiffness plastic material with the layers bonded together with the central core layer sandwiched between the outer layers to form the laminate structural material. This construction is producible at a commercially competitive price and provides both excellent impact characteristics and excellent stiffness or rigidity characteristics.

BRIEF DESCRIPTION OF THE DRAWING

FIGS. 1A, 1B and 1C are schematic views showing a method and apparatus for forming a structural laminate plastic material according to the invention and for forming a pallet from the laminate structural material;

FIG. 2 is a plan view of the apparatus of FIG. 1;

FIG. 3 is a detail view of the invention laminate structural material;

FIG. 4 is a cross-sectional view of a pallet according to the invention;

FIG. 5 is a perspective view of a pallet according to the invention;

FIG. 6 is a detailed view taken within the circle 6 of FIG. 4; and

FIG. 7 is a detailed view taken within the circle 7 of FIG. 6.

DETAILED DESCRIPTION OF THE PREFERRED EMBODIMENT

The invention methodology illustrated in FIG. 1 is carried out utilizing a plurality of extruders 10, a combining adaptor 12, a cutter 14, an oven 16, and a press 18.

Extruder apparatus 10 includes a plurality of extruders 20, 22 and 24. The extruders are substantially identical and of known form and each includes a hopper 26, a cylindrical barrel 28, a motor 30, and a shaping die 32.

Each barrel 28, in known manner, includes a barrel heater and a screw positioned within the barrel and driven by the motor 30 so that plastic resin material fed in powder, pellet, flake, bead or granulated regrind form into hopper 26 is formed by the rotation of the screw and operation of the barrel heater, into a resin melt pool within the barrel, for delivery to the shaping die 32 where the cylindrical melt delivered from the barrel is shaped into a sheet.

The material A delivered to hopper 26 of extruder 22 comprises a polyolefin material essentially devoid of reinforcing filler materials. For example, material A may comprise a high density polyethylene material available from Allied-Signal, Inc. as High Density Polyethylene Grade BA50-100. This material has good impact characteristics (Tensile Impact, ASTM Test D1822, 125 ft. lbs/in$^2$) and is relatively inexpensive, but does not have especially good stiffness characteristics (Flexural Modulus, ASTM Test D790-88, 180,000 psi, Elongation at Break, ASTM Test D638 800%).

The material B fed to the hopper 26 of extruders 20 and 24 comprises a polyolefin material having a significant percentage of a reinforcing filler material. The reinforcing filler material is preferably an inorganic material and is preferably a siliceous material selected from the group consisting of talc, mica or quartz. For example, material B may comprise a high density polyethylene talc-filled material available from Allied-Signal, Inc. as High Density Polyethylene Grade BA7794. This material includes 25% by weight talc; has very good stiffness characteristics (Flexural Modulus, ASTM Test D790-88, 380,000 psi, Elongation at Break, ASTM Test D638-86, 20%); is somewhat more expensive than the unfilled virgin polyethylene; but does not have especially good impact characteristics (Tensile Impact, ASTM Test D1822, 45 ft. lbs/in$^2$).

The shaping dies 32 of extruders 20 and 24 may be dimensioned, for example, to form a thin continuous strip 34 having a thickness of 0.019 inches and the shaping die 32 of extruder 22 may be dimensioned to provide a continuous strip 36 having a thickness of 0.112 inches.

Strips 34, 36, 34 emerging from the shaping dies 32 of extruders 20, 22, 24 move through combining adapter 12 where they are bonded together, while still in a heated state, to form a laminate continuous structural strip 46. Combining adapter 12 includes a directional roll 40 engaging upper strip 34, a directional roll 42 engaging the lower strip 34, and nip rollers 44 receiving strips 34, 36, 34, and functioning to join or bond the heated strips together in a knitting or fusing operation to form laminate structural strip 46.

Laminate structural strip 46, as best seen in FIG. 3, includes a central core layer 36 of essentially virgin polyethylene material sandwiched between outer skin layers 34 of talc filled polyethylene material with each skin layer 34 having a thickness of 0.019 inches and the central core layer having a thickness of 0.112 inches so as to provide a total laminate strip thickness of 0.150 inches.

It will be understood that, whereas the invention process as illustrated in FIG. 1 is carried out using three separate extruders, the invention methodology may also be carried out with two extruders with one extruder forming the central core strip 36 and the second extruder forming a strip of the talc filled skin material which may thereafter be split or divided as it emerges from the shaping die of the second extruder into two talc filled skin strips 34 for combination in the manner described with the central core strip 36 to form the invention laminate structure.

The strip 46 leaving the combining adapter 12 is suitably transported to cutter 14 where the continuous strip is selectively cut into a plurality of individual sheets 48 which are successively delivered to a heater or oven 16 where the sheets are heated to a flowable plastic state.

After the sheets have been heated in the oven 16, they are suitably conveyed within suitable clamp frames to the press 18 wherein a first or upper sheet 50 is positioned proximate the upper mold 52 of the press and a second or lower sheet 52 is positioned proximate a lower mold 54 of the press. Upper mold 42 is carried in known manner by an upper platen 56 of the press and lower mold 54 is carried in known manner by a lower platen 58 of the press. Upper and lower platens 56 and 58 are relatively vertically movable in known manner by hydraulic or other power means between relatively separated and relatively adjacent positions.

Following positioning of the sheets 50 and 52 proximate upper and lower molds 52 and 54 with the press platens in a relatively separated position, vacuum is applied to the molds so as to pull the upper and lower sheets into conformity with the surface contours of the upper and lower molds respectively, as seen in FIG. 1B, whereafter, with the sheets still in a hot, flowable state, and as best seen in FIG. 1C, the platens 56 and 58 are closed relative to each other to bring the molds together to selectively knit or fuse shaped sheets 50 and 52 to form a twin structural article such as a pallet 60 which may thereafter be removed from the press following movement of the platens to their relatively separated positions.

The pallet 60 thus produced is seen in cross section in FIG. 4 and in perspective in FIG. 5 and includes an upper platform structure 62 and a plurality of legs 64 extending downwardly from the platform structure with the platform structure and the legs each formed from deformed and selectively fused together portions of the upper and lower sheets 50 and 52 and with each sheet 50, 52 formed of the laminate structural material 46 including an outer skin 34, a central core 36, and a further outer skin 34.

It will be seen that the pallet, in regions where the upper and lower sheets 50 and 52 are fused together such for example as along the side and bottom walls of the legs as best seen in FIG. 7, presents a six layer laminated and fused together structure comprising an outer skin 34, a central core 36, a pair of juxtaposed outer skins 34, a central core 36, and an outer skin 34, and that the pallet, in regions where the upper and lower sheets 50 and 52 are spaced apart such for example as in the platform structure as seen in FIG. 6, presents a composite configuration with a first laminate structural sheet comprising outer skins 34 and an inner core 36 separated by an air space from a second laminate structural sheet comprising outer skins 34 and an inner core 36.

Test results have confirmed that the pallet produced in accordance with the invention methodology, employing the relatively high stiffness talc filled polyethylene material for the outer skins and the relatively high impact essentially virgin polyethylene material for the central core layer, provides vastly superior stiffness characteristics as compared to a pallet formed with unfilled or virgin polyethylene, and yet retains most of the superior impact characteristics of the virgin polyethylene pallet.

Specifically, a pallet produced in accordance with the invention methodology has been found to retain 70% of the superior stiffness characteristics of the talc filled polyethylene material while retaining substantially all of the superior impact characteristic of the virgin polyethylene material. Further, although the talc filled polyethylene material involves a price penalty as compared to the virgin polyethylene material, the relatively thin outer skin dimension and the relatively thick inner core dimension result in a laminated structure that is 75% virgin polyethylene and only 25% talc filled polyethylene so that the composite structure may be produced at a material price that is only slightly greater than the material price of the virgin polyethylene.

The invention will be seen to provide a new and improved laminate structural material; to further provide an improved method of forming a laminate structural material; to further provide an improved method of forming a relatively rigid structural article; and to further provide an improved structural plastic article employing the improved structural laminated material. Specifically, the invention enables the production of a structural plastic article at a cost that involves only a slight penalty as compared to the cost of a structural plastic article formed of virgin polyethylene and yet provides an article that has vastly superior stiffness characteristics as compared to the virgin polyethylene article while yet retaining substantially all of the superior impact characteristics of the virgin polyethylene article.

Whereas a preferred embodiment of the invention has been illustrated and described in detail, it will be obvious that various changes may be made in the disclosed embodiment without departing from the scope or spirit of the invention.

For example, although the invention has been described with respect to the production of a pallet, the invention material and methodology is applicable to any plastic structural article wherein both high impact and high stiffness characteristics are required or desired.

Further, although the structural material of the invention has been described as including outer layers of 25% talc filled polyethylene, higher talc filled percentages in the outer layers, perhaps as high as 50%, may prove advantage in some applications. In fact, preliminary studies have indicated that a laminate structural material having a virgin polyethylene core and outer skin layers of 50% talc filled polyethylene may actually provide an article having greater stiffness than an article formed entirely of 25% talc filled polyethylene while also, by virtue of the central virgin polyethylene core, having vastly superior impact characteristics as compared to the article formed entirely of 25% talc filled polyethylene.

Further, it should be understood that, in a typical article forming process involving extrusion, thermoforming, fusing, and trimming, for economical and ecological reasons, the trim or "off fall" trimmed from the molded product to produce the finished product is recovered and fed back into the hoppers of the extruders so that, in the invention process, wherein the trim will inherently include both virgin polyethylene material and talc filled material, some amount of talc filled material will routinely be fed into the hopper 26 of the extruder 22 for combination with virgin polyethylene material with the result that trace amounts of talc may appear in the central layer 36 of the laminate structural sheet 46. The term "essentially devoid of reinforcing filler material" as used in the claims is intended to include central core layers having such trace amounts of talc filler material.

I claim:

1. A laminate structural material comprising:
    central inner core layer formed of a polyolefin material essentially devoid of reinforcing filler materials; and
    a pair of outer skin layers sandwiching said core layer therebetween and each formed of a polyolefin material having a percentage by weight of a reinforcing filler material higher than the percentage by weight of filler material in said inner core layer, wherein said core layer has a thickness at least twice as great as the thickness of each skin layer.
2. A structural material according to claim 1 wherein: said layers are formed of polyethylene.
3. A structural material according to claim 1 wherein: said reinforcing filler material in said skin layers comprises an inorganic filler material.
4. A structural material according to claim 3 wherein: said filler material comprises a siliceous filler material.
5. A structural material according to claim 4 wherein: said filler material is selected from the group consisting of talc, mica or quartz.
6. A structural material according to claim 5 wherein: said filler material comprises talc.
7. A structural material according to claim 6 wherein: said talc comprises approximately 15–50% by weight of said skin layers.
8. A structural material according to claim 7 wherein: said talc comprises approximately 25% by weight of said skin layers.
9. A structural material according to claim 1 wherein: said core layer has a thickness at least twice as great as the thickness of each of said skin layers.
10. A structural material according to claim 9 wherein:
    said core layer has a thickness at least trice as great as the thickness of each of said skin layers.
11. A method of forming a laminate structural material comprising the steps of forming a central inner core layer formed of a polyolefin material essentially devoid of reinforcing filler material and a pair of outer skin layers each formed of a polyolefin material having a percentage by weight of a reinforcing filler material higher than the percentage by weight of reinforcing filler material in said inner core layer, wherein said core layer has a thickness at least twice as great as the thickness of each skin layer;

bonding said layers together with said core layer sandwiched between said skin layers to form said laminate structural material.

12. A method according to claim 11 wherein:
said layers are formed and bonded together in a coextrusion process.

13. A method according to claim 12 wherein:
said layers are formed of polyethylene.

14. A method according to claim 12 wherein:
said reinforcing filler material in said skin layers comprises an inorganic filler material.

15. A method according to claim 14 wherein:
said filler material comprises a siliceous filler material.

16. A method according to claim 15 wherein:
said filler material is selected from the group consisting of talc, mica or quartz.

17. A method according to claim 16 wherein:
said filler material comprises talc.

18. A method according to claim 17 wherein:
said talc comprises approximately 15-50% by weight of said skin layers.

19. A method according to claim 16 wherein:
said talc comprises approximately 25% by weight of said skin layers.

20. A method according to claim 11 wherein:
said core layer has a thickness at least twice as great as the thickness of each of said skin layers.

21. A method according to claim 20 wherein:
said core layer has a thickness at least trice as great as the thickness of each of said skin layers.

22. A method of forming a relatively rigid structural article comprising the steps of:
forming a central core layer of a first high impact plastic material;
forming a pair of outer skin layers of a second plastic material having less impact strength than said first material but greater stiffness strength than said first material;
bonding said layers together with said core layer sandwiched between said outer skin layers to form a laminate structural material; and
thermoforming said laminate structure material to form said rigid structural article.

23. A method according to claim 22 wherein:
said forming steps comprise heat extruding steps; and
said bonding step comprises bringing the extruded layers together while still in a heated state to form a continuous laminate strip.

24. A method according to claim 22 wherein:
said thermoforming step comprises a vacuum thermoforming step.

25. A method according to claim 23 wherein said structural article is a twin sheet article and wherein:
said method includes the further step of severing said strip to form at least two individual sheets; and
said thermoforming step comprises individually thermoforming said sheets and thereafter selectively fusing said sheets together to form said rigid twin sheet structural article.

26. A method according to claim 22 wherein:
said central core layer is and is formed of a polyolefin material essentially devoid of reinforcing filler materials; and
said outer layers comprise outer skin layers each formed of a polyolefin material having a percentage by weight of a reinforcing filler material higher than the percentage by weight of reinforcing filler material in said inner core layer, wherein said core layer has a thickness at least twice as great as the thickness of each skin layer.

27. A method according to claim 26 wherein:
said layers are formed of polyethylene.

28. A method according to claim 25 wherein:
said reinforcing filler material in said skin layers comprises an inorganic filler material.

29. A method according to claim 28 wherein:
said filler material comprises a siliceous filler material.

30. A method according to claim 29 wherein:
said filler material is selected from the group consisting of talc, mica or quartz.

31. A method according to claim 30 wherein:
said filler material comprises talc.

32. A method according to claim 31 wherein:
said talc comprises approximately 15-50% by weight of said skin layers.

33. A method according to claim 32 wherein:
said talc comprises approximately 25% by weight of said skin layers.

34. A method according to claim 22 wherein:
said core layer has a thickness at least twice as great as the thickness of each of said skin layers.

35. A method according to claim 33 wherein:
said core layer has a thickness at least trice as great as the thickness of each of said skin layers.

36. A method of forming a pallet comprising the steps of:
forming a central core layer of a high impact plastic material;
forming a pair of outer layers of a second plastic material having less impact strength than said first material but greater stiffness strength than said first material;
bonding said layers together with said core layer sandwiched between said outer layers to form a laminate structural material; and
thermoforming said laminated structural material to form said pallet.

37. A method according to claim 36 wherein said pallet is a twin sheet pallet and wherein:
said forming steps comprise heat extruding steps;
said bonding step comprises bringing the extruded layers together while still in a heated state to form a continuous laminate strip;
said method includes the further step of severing said strip to form an upper sheet and a lower sheet; and
said thermoforming step comprises individually thermoforming said upper and lower sheets and thereafter selectively fusing said sheets together to form said pallet.

38. A plastic structural article characterized in that the article is formed of a laminate structural material comprising a central core layer formed of a first high impact plastic material and a pair of outer skin layers sandwiching said core layer, wherein said core layer has a thickness at least twice as great as the thickness of each skin layer therebetween and formed of a second plastic material having less impact strength than said first material but greater stiffness strength than said first material.

39. An article according to claim 38 wherein:
said article is a twin sheet article formed from first and second sheets and each of said sheets is formed of said laminate structural material.

40. An article according to claim 39 wherein:

said article is a pallet including a platform structure and a plurality of legs extending downwardly from said platform structure; and said legs and platform structure are each formed from deformed and selectively fused together portions of said first and second sheets.

41. An article according to claim 38 wherein:

said first plastic material forming said central inner core layer comprises a polyolefin material essentially devoid of reinforcing filler materials; and said second plastic material comprising said outer layers comprises a polyolefin material having a percentage by weight of a reinforcing filler material higher than the percentage by weight of reinforcing filler material in said inner core layer.

42. An article according to claim 41 wherein:
said layers are formed of polyethylene.

43. An article according to claim 42 wherein:
said reinforcing filler material in said outer layers comprises an inorganic filler material.

44. An article according to claim 43 wherein:
said filler material comprises a silicious filler material.

45. An article according to claim 44 wherein:
said filler material is selected from the group consisting of talc, mica or quartz.

46. An article according to claim 45 wherein:
said filler material comprises talc.

47. An article according to claim 46 wherein:
said talc comprises approximately 15-50% by weight of said outer layers.

48. An article according to claim 47 wherein:
said talc comprises approximately 25% by weight of said outer layers.

49. An article according to claim 48 wherein:
said core layer has a thickness at least twice as great as the thickness of each of said outer layers.

50. An article according to claim 49 wherein:
said core layer has a thickness at least thrice as great as the thickness of each of said outer layers.

51. A twin sheet plastic structural article comprising first and second plastic sheets individually thermoformed and selectively fused together to form the twin sheet article, characterized in that said sheets are each formed of a laminate structural material comprising a central inner core layer formed of a polyolefin material essentially devoid of reinforcing filler material and a pair of outer skin layers sandwiching said core layer, wherein said core layer has a thickness at least twice as great as the thickness of each skin layer therebetween and each formed of a polyolefin material having a percentage by weight of a reinforcing filler material higher than the percentage by weight of reinforcing filler material in said inner core layer.

* * * * *